(12) United States Patent
Delo et al.

(10) Patent No.: US 6,397,381 B1
(45) Date of Patent: May 28, 2002

(54) SYSTEM AND METHOD FOR REPAIRING A DAMAGED APPLICATION PROGRAM

(75) Inventors: John C. Delo, Bellevue; Malcolm S. Haar, Seattle; Tracy D. Ferrier, Issaquah; Chetan A. Parulekar, Redmond; Benjamin Chamberlain, Redmond; David E. Gonzalez, Issaquah; David R. McKinnis, Seattle, all of WA (US)

(73) Assignee: Microsoft Corporation, Redmond, VA (US)

( * ) Notice: Subject to any disclaimer, the term of this patent is extended or adjusted under 35 U.S.C. 154(b) by 0 days.

(21) Appl. No.: 09/158,126

(22) Filed: Sep. 21, 1998

(51) Int. Cl.[7] .............................................. G06F 9/445
(52) U.S. Cl. ........................ 717/11; 707/202; 714/15
(58) Field of Search ............................ 717/11; 707/10, 707/202, 204; 709/221, 222, 217, 203; 713/100; 714/48, 53, 54, 5, 15, 2, 18

(56) References Cited

U.S. PATENT DOCUMENTS

| | | | | |
|---|---|---|---|---|
| 4,498,145 A | * | 2/1985 | Baker et al. | ................ 707/202 |
| 5,421,009 A | | 5/1995 | Platt | |
| 5,473,772 A | | 12/1995 | Halliwell et al. | |

(List continued on next page.)

OTHER PUBLICATIONS

"Automating Microsoft Transaction Server Client Installation," Microsoft Corporation, URL:wysiwyg://MAIN-.PRODINFO.6/http://msdn.mi . . . m/library/backgrnd/html/msdn_install.html (Jun. 1997). printed Feb. 29, 2000.
Dunigan, et al., *MCSE Training Guide: Windows NT Workstation 4*, New Riders Publishing, pp. 28–32, 402–405, 486–492 (1997).
Lang, Jay., "IBM Bolsters Windows NT Reliability With Tools Suite," *Information Week*, p. A6ff (Jul. 20, 1998).
Green, "Windows Apps Need To Be Aware of Install Methods", *Network World*, p. 45 (Nov. 1994).
McKinney et al., "Win Tips Windows 9x", *Windows Magazine*, pp. 255–258 (Aug. 1998).
McNutt, "Administering X Sites", *Unix Review*, p. 45ff (Jul. 1992).
Methvin, David, "Problems? In Win98?", *Windows Magazine*, pp. 224ff (Oct. 1998)
Spanbauer, Scott, "Internet Explorer 4.0, Problem Child", *PC World*, p. 53 (Jan. 1998).
Cameron Sturdevant, "Easing App Distribution; Installer, NAL features to be folded into NT, IntranetWare Its SMS Installer 1.2 extends s/w distribution capabilities of SMS & makes apps rollouts easier," PC Week, Jun. 2, 1997, pp. 074 (4 pages).*
"Seagate Enterprise Management Software—East Announces Release of Desktop Management Suite; Best–of–Breed Point Solutions Integrated To Provide Heterogenous LAN Management" Business Wire, Apr. 2, 1996, pp. 04020056.*
Kelly, M., "Gain Control of Application Setup and Maintenance with the New Windows Installer", Microsoft Systems Journal: Sep. 1998, pp. 15–27.

*Primary Examiner*—Tuan Q. Dam
(74) *Attorney, Agent, or Firm*—Michalik & Wylie, PLLC

(57) ABSTRACT

A system and method for providing the ability to repair an installed application program if a resource needed by the application program becomes inadvertently deleted or otherwise unavailable to the application program. Briefly described, the present invention makes possible a system for verifying the existence of a resource needed to support a feature of the application program. The system may respond to a request from the application program to make use of the resource by first verifying the existence of the resource at an expected location. If the resource does not exist at the expected location, rather than returning an error to the application program, the system initiates an installation procedure for restoring the missing resource without interrupting the normal operation of the application program.

22 Claims, 4 Drawing Sheets

U.S. PATENT DOCUMENTS

| | | | |
|---|---|---|---|
| 5,535,326 A | * 7/1996 | Baskey et al. | 714/4 |
| 5,555,416 A | 9/1996 | Owens et al. | |
| 5,625,823 A | 4/1997 | Debenedictis et al. | |
| 5,630,076 A | 5/1997 | Saulpaugh et al. | |
| 5,644,766 A | 7/1997 | Coy et al. | |
| 5,655,081 A | 8/1997 | Bonnell et al. | |
| 5,659,547 A | 8/1997 | Scarr et al. | |
| 5,692,129 A | 11/1997 | Sonderegger et al. | |
| 5,732,266 A | 3/1998 | Moore et al. | |
| 5,732,275 A | 3/1998 | Kullick et al. | |
| 5,742,829 A | 4/1998 | Davis et al. | |
| 5,752,042 A | 5/1998 | Cole et al. | |
| 5,764,992 A | 6/1998 | Kullick et al. | |
| 5,778,234 A | 7/1998 | Hecht et al. | |
| 5,784,612 A | 7/1998 | Crane et al. | |
| 5,790,664 A | 8/1998 | Coley et al. | |
| 5,790,856 A | 8/1998 | Lillich | |
| 5,796,967 A | 8/1998 | Filepp et al. | |
| 5,805,897 A | 9/1998 | Glowny | |
| 5,835,911 A | 11/1998 | Nakagawa et al. | |
| 5,859,969 A | 1/1999 | Oki et al. | |
| 5,859,978 A | 1/1999 | Sonderegger et al. | |
| 5,867,713 A | 2/1999 | Shrader et al. | |
| 5,867,714 A | 2/1999 | Todd et al. | |
| 5,870,762 A | * 2/1999 | Lee | 707/202 |
| 5,897,640 A | 4/1999 | Veghte et al. | |
| 5,925,127 A | 7/1999 | Ahmad | |
| 5,930,513 A | 7/1999 | Taylor | |
| 5,933,647 A | 8/1999 | Aronberg et al. | |
| 5,954,827 A | * 9/1999 | Frank et al. | 714/48 |
| 5,960,204 A | 9/1999 | Yinger et al. | |
| 5,964,885 A | * 10/1999 | Little et al. | 714/2 |
| 5,978,590 A | 11/1999 | Imai et al. | |
| 5,987,504 A | 11/1999 | Toga | |
| 5,999,740 A | 12/1999 | Rowley | |
| 6,006,034 A | 12/1999 | Heath et al. | |
| 6,006,035 A | 12/1999 | Nabahi | |
| 6,009,274 A | 12/1999 | Fletcher et al. | |
| 6,009,401 A | 12/1999 | Horstmann | |
| 6,021,438 A | 2/2000 | Duvvoori et al. | |
| 6,023,586 A | 2/2000 | Gaisford et al. | |
| 6,029,147 A | 2/2000 | Horadan et al. | |
| 6,041,333 A | 3/2000 | Bretschneider et al. | |
| 6,067,582 A | 5/2000 | Smith et al. | |
| 6,073,128 A | * 6/2000 | Pongracz et al. | 707/3 |
| 6,131,192 A | 10/2000 | Henry | |
| 6,148,412 A | * 11/2000 | Cannon et al. | 714/6 |
| 6,151,643 A | 11/2000 | Cheng et al. | |
| 6,151,708 A | 11/2000 | Pedrizetti et al. | |
| 6,161,218 A | 12/2000 | Taylor | |

* cited by examiner

SYSTEM AND METHOD FOR REPAIRING A DAMAGED APPLICATION PROGRAM

CROSS-REFERENCE TO OTHER APPLICATIONS

This application is related to the following applications, all of which are filed on the same day and assigned to the same assignee as the present application: "Use of Relational Databases for Software Installation" —Ser. No. 09/158,125; "Method and System for Restoring a Computer to its Original State After an Unsuccessful Installation Attempt" —Ser. No. 09/158,124; "A Method for Categorizing and Installing Selected Software Components" —Ser. No. 09/157,695; "System and Method for Managing Locations of Software Components Via a Source List" —Ser. No. 09/157,974; "Method for Optimizing the Installation of a Software product onto a Target Computer System" —Ser. No. 09/157,853; "Software Installation and Validation Using Custom Actions" —Ser. No. 09/157,776; "Internal Database Validation" —Ser. No. 09/157,828; "Management of Non-persistent Data in a Persistent Database" —Ser. No. 09/157,883; "Method and System for Advertising Applications" —ser. No. 09/158,967; "Software Implementation Installer Mechanism" —Ser. No. 09/158,021.

TECHNICAL FIELD

The present invention generally relates to computer software application programs for providing to other installed application programs the ability to repair missing program files. More particularly, the present invention relates to an application program or software module for verifying the existence of a program file at an expected location, and for installing the program file to that expected location if the program file is missing.

BACKGROUND OF THE INVENTION

Before use, an application program must typically be installed to a computer system. The installation procedure generally involves copying executable and data files (the "program files") related to the application program from a source location to an installed location on the computer system. Typically, the source location is an installation disk or location on a network drive accessible by the computer system. Often the program files are stored in a compressed format to conserve storage space.

Today, application programs use a variety of installation technologies to copy the program files from the source location to the computer system. Most often, an application program will include a special application program (the "set-up program") for administering and performing the installation procedure. Generally, the set-up program is unique to the application program and is customized to install the program files from the source location to pre-configured locations on the computer system. Often the user is provided the option of redirecting the installation of the program files to other locations on the computer system.

The typical set-up program not only installs the program files to the computer system, but also creates entries in a central registration database, such as a system registration database (the "system registry"), which identify the locations of the program files on the computer system. The location may be identified by a "path" to a particular directory or folder of the computer system in which reside the program files. The entries in the system registry are typically maintained by the application program itself. While executing, the application program generally queries the system registry for the path to an installed program file, and then accesses the installed program file at the path identified in the system registry.

Any changes to the entries in the system registry are governed by the application program.

Current installation technologies perform satisfactorily if the program files are never inadvertently deleted or moved from their installed locations. As mentioned, the start-up program creates the entries in the system registry which define the path to the installed program files. Installation technologies today do not include a mechanism for policing the installed state of the program files after installation. In addition, current installation technologies do not include the ability to verify the existence of a program file after it has been installed, for instance at run-time of the application program.

One problem plaguing software developers is the over-zealous computer user. Often, the over-zealous user, in an attempt to minimize disk space usage on the computer system, may delete a program file with which the user is unfamiliar. Likewise, the over-zealous user may attempt to rearrange the file structure of the computer system by moving the program files after installation. Unfortunately, existing installation technologies do not include the ability to identify and repair the situation where a program file is expected to be at an installed location but is no longer at that location.

Currently, when an application program queries the system registry for the path to a program file, the operating system performs a simple table look-up in the system registry and returns the path to the program file. However, no verification is performed to ensure that the program file still exists at the path originally written by the set-up program. The operating system acts as a simple database look-up engine. If a program file is inadvertently deleted, it will go undetected until needed. Consequently, the application program may attempt to launch or access the program file at the path and receives an error message indicating that the program file is unavailable.

In such a situation, the application program is typically unable to continue functioning properly and may generate an error prompting the user to execute the set-up program again to repair the missing program file. In that case, the user is forced to terminate the current process and handle the error before continuing. The normal operation of the application program is interrupted, and the user may be greatly inconvenienced until the dilemma of the missing program file is resolved.

Thus, existing installation technologies fail to support the ability to repair an application program if a requested program file becomes deleted or otherwise unavailable at the program file's installed location. Accordingly, there is a need in the art for a system and method for installing an application program which provides the ability to efficiently resolve the situation where an installed program file becomes inadvertently unavailable to the application program. In addition, there is a need in the art for a system and method for verifying the existence of an installed program file upon an indication by the application program that the program file is needed. Moreover, there is a need in the art for a system and method for providing an application program with the ability to install a missing program file in a background process that does not terminate the application program's current process.

SUMMARY OF THE INVENTION

The present invention meets the above-described needs by providing the ability to identify a missing program file necessary to an application program, and to install the missing program file without interrupting the operation of the application program. The present invention achieves that result by receiving an indication that a resource, such as a program file or registry key, is needed by the application program. The indication may take the form of a request for the location of the needed resource. The present invention may maintain a listing of the locations of the resources needed by the application. In response to the indication, the present invention verifies the existence of the needed resource prior to the application attempting to execute the resource. The verification may be achieved by querying for the existence of the resource at the location maintained in the listing. If the resource does not exist, the present invention initiates the installation of the resource. The installation may occur in a background process without interrupting the application program, or by prompting the application program for instructions whether to install the missing resource.

In one embodiment, when an application program is installed, an installer application stores information in a registration database (the "installer registry") related to the locations of the application program's resources, such as program files and registry keys. The installer registry may be a portion of the general system registry, or the installer registry may be a stand-alone registration database. A resource identifier may be assigned to each resource to uniquely identify that resource from other resources. Within the installer registry, the location of each resource may be associated with the resource identifier for that resource.

To invoke a particular "feature," the application program indicates to the installer application which feature to invoke by passing to the installer application a resource identifier for a resource needed by that feature. A "feature" is a granular piece of the product that a user may choose to install or execute. Features typically correspond roughly to the functional features of the program itself, such as a proofing tools feature or a word processing feature. Invoking the feature may constitute selecting an option from the menu, querying the installer application to identify which features of the application program are installed, or other methods for invoking the feature as will be understood by those skilled in the art.

The resource identifier passed to the installer application may take the form of a "token," which may include one or more of the following arguments: an identifier for the application program (the "Product Code"), an identifier for the invoked feature (the "feature identifier"), or an identifier for a "component" related to the resource needed by the feature (the "Component Code"). A "component" is a collection of resources, such as files, shortcuts, or registry keys, that are all installed or un-installed as a unit. Components are the building blocks of the program that are not exposed to the user. Alternatively, the resource identifier may take the form of a "descriptor," which may include similar information to the token, but formatted to be more easily interpreted by the installer application.

Again in one embodiment, passing the resource identifier may include issuing an application programming interface ("API") call, with the resource identifier as a parameter, to the installer application in the form of a request for the location of the resource identified by the resource identifier. In response to receiving the API call, the installer application first accesses the installer registry and retrieves the location of the resource associated with the resource identifier. The installer application then verifies the existence of the resource at that location. If the resource exists at the location, the installer application returns the location to the application program. The application program then accesses the resource at the location. However, if the installer application fails to verify the existence of the resource at the location, the installer application initiates a repair procedure.

The repair procedure may take two forms. A "brute force" repair procedure may be used, generally if the application program is an operating system function or service, such as a shortcut maintained by the operating system. In that case, the installer application may automatically execute an installation procedure to install the resource. Installing the resource may include prompting a user for a "source" which contains the program files for the application program, retrieving the program files from the source, and writing the program files and other resources to the appropriate location. Processing may then return to the application program by passing the location of the newly-installed resource to the application.

Another repair procedure may also be invoked, generally for conventional application programs. Rather than automatically executing the installation procedure, the installer application may return a message to the application program that the resource does not exist at the expected location. The application program may then choose from several alternatives to handle the message. For instance, the application program may prompt the user to choose whether to install the missing resource, or the application program may be pre-configured to automatically execute the installation procedure for certain missing resources. If the choice is made to install the missing resource, the application program indicates that choice to the installer application. The installer application then executes the installation procedure, in the same fashion as that described above, and the missing resource is installed.

In that manner, if a resource becomes deleted or otherwise not available at an expected location, rather than the application program being forced to quit, or execute with unstable characteristics, the absence of the missing resource is detected, and it may be installed either automatically (without user or application program input) or only if desired.

DETAILED DESCRIPTION OF THE INVENTION

The present invention is directed to a system and method for providing the ability to repair an installed application program if a resource needed by the application program becomes inadvertently deleted or otherwise unavailable to the application program. Briefly described, the present invention makes possible a system for verifying the existence of a resource needed to support a feature of the application program. The system may respond to a request from the application program to make use of the resource by first verifying the existence of the resource at an expected location. If the resource does not exist at the expected location, rather than returning an error to the application program, the system initiates an installation procedure for restoring the missing resource without interrupting the normal operation of the application program.

Exemplary Operating Environment

Figure 1:
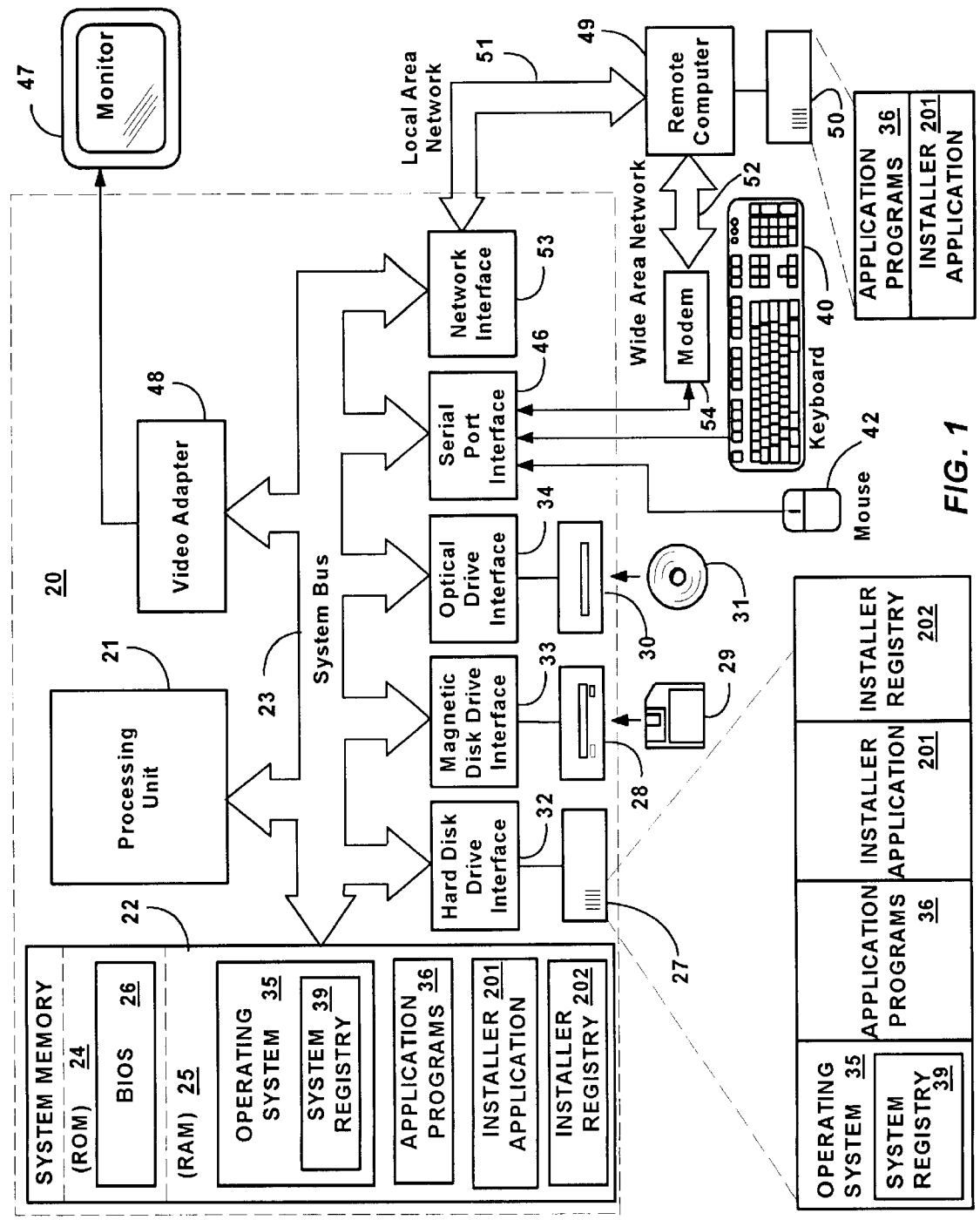
FIG. 1 is a block diagram of a conventional personal computer that provides a portion of the operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computerreadable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules, such as an installer application 201 in accordance with an exemplary embodiment of the present invention, and program data, such as an installer registry 202 associated with the installer application 201. The operating system 35 may include a system registry 39. In this embodiment, the invention may reside within the installer application 201 and the installer registry 202. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device 50. It will be appreciated that the network connections shown are exemplary and other means of establishing a communications link between the computers may be used.

Discussion of Terminology

Before discussing the details of the installer application 201, a brief discussion of terminology is needed. In accordance with an exemplary embodiment of the invention, the installer application 201 recognizes three principal elements: products, features, and components. The installer application 201 is also described in application Ser. No. 09/158,125, entitled "Use of Relational Databases for Software Installation" which was filed on the same day and assigned to the same assignee as the present application and is incorporated herein be reference. A "product" represents a single, entire application program, such as the Microsoft Office application program marketed by Microsoft Corporation of Redmond, Wash. Each product has a globally unique identifier ("GUID") known as a Product Code which allows products to be distinguished. Each product is made up of one or more features. A "feature" is a granular piece of the product that a user may choose to install or execute. Features typically correspond roughly to the functional features of the product itself, such as a "Proofing Tools" feature or a "Word" feature. Each feature is essentially a grouping of components and may also include other features. Features need not be globally unique, and therefore may be identified by any appropriate means, such as with a textual feature identifier.

A "component" is a collection of resources, such as program files or registry keys, that are all installed or uninstalled as a unit. Components are the building blocks of the product that are not exposed to the user. A resource, such as a program file or a registry key, may be part of only one component. Two components may not share the same resource whether they are part of the same product or parts of different products. Each component has a GUID known as a Component Code. One resource within the component is designated as a "key file." The key file may be any resource, such as a program file or registry key, within the component.

Figure 2:
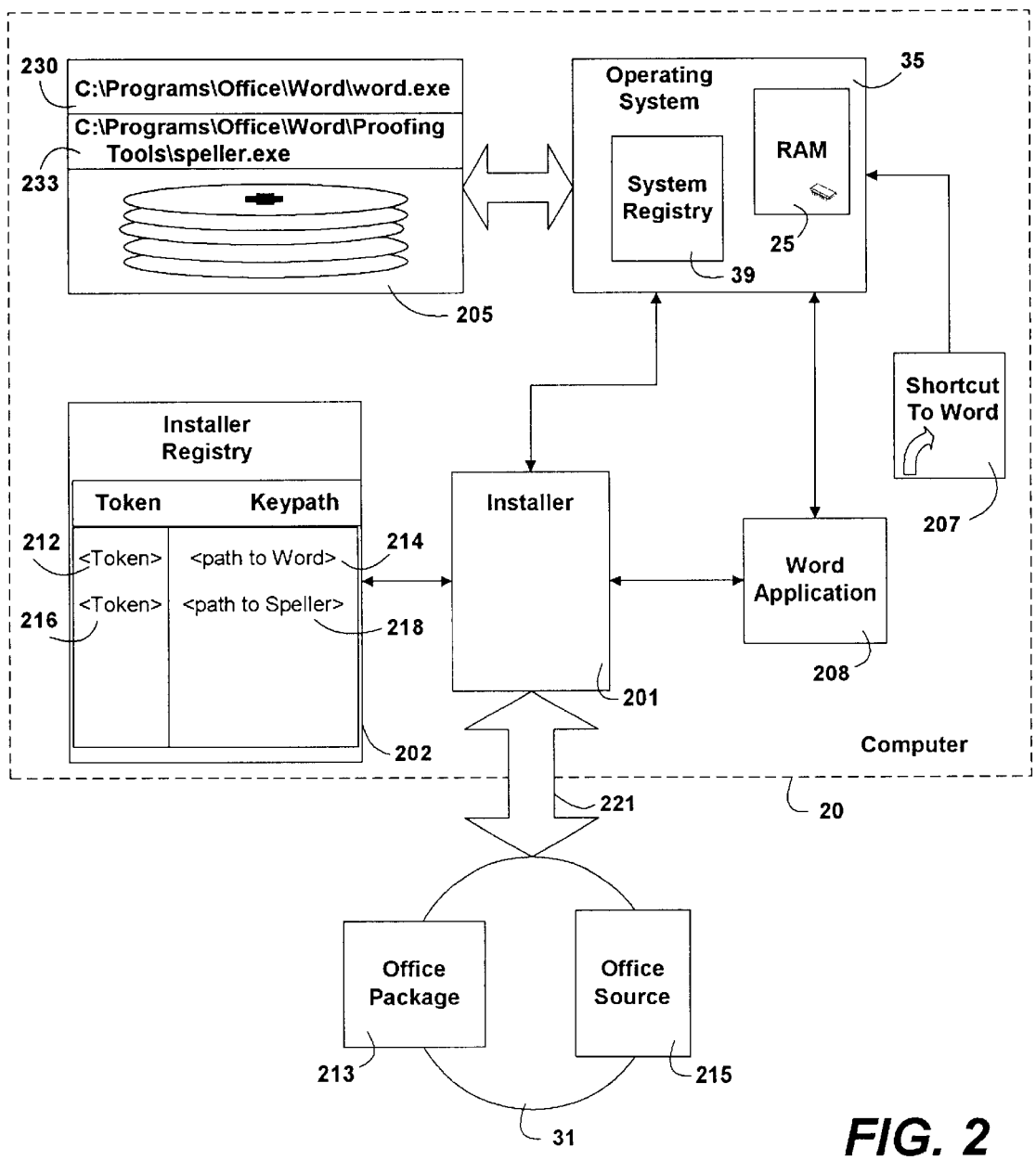
FIG. 2 is a functional block diagram of the conventional personal computer of FIG. 1, including an installer application constructed in accordance with an exemplary embodiment of the present invention.

FIG. 2 is a functional block diagram of a computer environment making use of an installer application 201 constructed in accordance with an exemplary embodiment of the present invention. A computer is illustrated, such as conventional personal computer 20, including the installer application 201, an installer registry 202, an operating system 35, a hard-disk drive 205, a "shortcut" 207, and an executing application 208. Each of those items is described and discussed in greater detail below.

Also illustrated are a package file 213 and a source 215. The package file 213 and the source 215 may reside on a CD-ROM disk 31 accessible to the computer 20 via an optical disk drive 30 and over transmission path 221. The package file 213 and the source 215 may also exist in any other location accessible by the computer 20. The package file 213 and the source 215 are discussed in further detail below. The functionality and construction of the installer application 201 is best described by example, through the installation and execution of a product.

Example of Installation Procedure

To begin the example, a user initiates the installation of the product, such as the Microsoft Office application program. Initiating the installation may constitute the act of inserting CD-ROM disk 31 in optical disk drive 30, or the act of executing a remote startup script over a network connection, or any other means of initiating the installation. Once the installation is initiated, the installer application 201 assumes control of processing.

The installer application 201 begins the installation by reading the package file 213 into memory, such as RAM 25. The package file 213 is unique to the product and is essentially a database which describes, among other things, the relationships between the features, components, and resources of the product. The package file 213 may include the unique identifiers assigned to each of the features and components of the product.

The installer application 201 reads the package file 213 and uses the information stored within to determine the installation operations that must be performed for the product. For instance, the installer application 201 may display a dialog box which presents the user with the option of selecting which features of the product to install. The user may be presented with the option of selecting a "Word" feature, an "Excel" feature, and a "Proofing Tools" feature. The user may then select which features to install to the computer 20. As discussed above, a feature is a grouping of components, and the components identify the actual resources to be installed to the computer 20. Accordingly, once the user has selected the desired features of the product, the installer application 201 resolves those features into a listing of components to be installed.

The source 215 contains the actual resources associated with the components. The source 215 may also include a reference table to identify the associations between the resources and the components. Those components making up the selected features are copied from the source 215 to an appropriate location on the computer 20, such as to the hard-disk drive 205 or to a system registry 39 maintained by the operating system 35. As mentioned above, a component is a collection of resources, such as program files, shortcuts, or registry keys. Those skilled in the art will recognize that the phrase "reading the component" may actually refer to reading the resources associated with the component. Likewise, the phrase "writing the component" may refer to writing the resources associated with the component. However, for simplicity only, this discussion may use the terms reading, writing, or copying components interchangeably with performing those actions on the underlying resources.

The appropriate location for a component on the computer 20 may depend upon the type of resources associated with the component. For instance, if the component includes program files, the component may be stored in the file system of the hard-disk drive 205. However, if the component includes registry keys, the component may be stored in the system registry 39. In addition, a component may include both program files and registry keys, in which case program files are stored in the file system of the hard-disk drive 205, and the registry keys are stored in the system registry 39. If the user identifies a particular location within the file system of the hard-disk drive 205 for a feature, then the installer application 201 will write the program files of components associated with that feature to that particular location.

When a component is written to the appropriate location, the installer application 201 creates an entry in the installer registry 202 corresponding to the component. The entry includes a "keypath" for the component, and an identifier for the component, termed a "token." In the disclosed embodiment, the token includes the following arguments: the Product Code of the product installing the component, the feature identifier of the feature containing the component, and the Component Code of the component. Those skilled in the art will appreciate that systems may be designed in which tokens include more or fewer arguments. The term "token" as used herein refers to any identifier capable of uniquely distinguishing one component from other components, or one feature from other features.

Also in the disclosed embodiment, the keypath may be a path in the file system where the component is actually stored. More precisely, the keypath to a component may be the path to the component's key file. For instance, in the disclosed example, the product installed may include a "Word Feature" having a "Word Executable Component." The Word Executable Component may have the key file "word.exe" 230. The Word Feature may also include a "Proofing Tools Feature," which is actually a sub-feature. As mentioned above, a feature may include subfeatures. The Proofing Tools Feature may include a "Spelling Component." The Spelling Component may have the key file "speller.exe" 233.

Continuing with the example, the Word Executable Component may be installed to the location on the hard-disk drive 205 identified by the path "C:\Programs\Office\Word\." Accordingly, the word.exe 230 key file is written to that location, and an entry in the installer registry 202 includes a token 212 identifying the Word Executable Component and the keypath 214 to the word.exe 230 key file. In a similar manner, the Spelling Component may be written to the path "C:\Programs\Office\Word\Proofing Tools\," and an entry in the installer registry 202 may be created with a token 216 identifying the Spelling Component, and a keypath 218 to the speller.exe 233 key file. It should be noted that the keypath 218 actually identifies the location of the speller.exe 233 key file, which corresponds to the location of the Spelling Component.

The entry in the installer registry 202 may also include a usage counter (not shown) to identify the number of products requiring a component. In that case, if more than one product requiring a component is installed, the usage counter may prevent the component from being deleted if only one such product is uninstalled.

The installer application 201 continues with the installation process until all of the components making up the selected features are written to the appropriate locations on the computer 20. When all of the components are written, installation is complete and the installer registry 202 is populated with an entry for each installed component. Each entry includes an identifier for the component (the token) and a keypath identifying the location at which the component is stored.

Example of Product Execution

The following discussion gives an overview of the functionality of the installer application 201 once the product is installed. To review, the installer application 201 installed the features of the product selected by the user at installation. The components making up those selected features were written to appropriate locations on the computer 20. For instance, a Word Executable Component and a Speller Component were written to the file system of the hard-disk drive 205. As discussed above, installing those components may include writing the key files of those components to a keypath location in the file system of the hard-disk drive 205.

Also during installation, a shortcut 207 to the Word Executable Component was created. The shortcut 207 is an operating system 35 service which allows indirect access to a resource stored on the hard-disk drive 205. A shortcut is sometimes referred to as an "alias." The shortcut 207 is generally presented to the user as an icon or file which, when activated, launches an executable file associated with the shortcut 207. In the disclosed example, the shortcut 207 is associated with the Word Executable Component such that activating the shortcut 207 causes the operating system 35 to launch the key file associated with the Word Executable Component, in this case the word.exe 230 executable file.

When the user activates the shortcut 207, the operating system 35 first creates a shell or process within which the executable file will execute. In accordance with the disclosed embodiment, activating the shortcut 207 causes the operating system 35 to query the installer application 201 for the keypath to the executable file associated with the shortcut 207, in this case the keypath 214 to the word.exe 230 executable file. The operating system 35 may query for the keypath 214 by calling the installer application's 201 "Provide Component" call with a parameter identifying the Word Executable Component. In the disclosed embodiment, the parameter may be a token which includes a Component Code to uniquely identify the Word Executable Component. The Component Code is a GUID to distinguish the Word Executable Component from other components, such as the Spelling Component. The token may also include a Product Code to uniquely identify the product as the Microsoft Office application program. The Product Code may likewise be a GUID to distinguish the Microsoft Office product from other products. In addition, the token may include a feature identifier to identify the Word Feature. The feature identifier may be a GUID or it may be a textual identifier associated with the feature. One example of such a token may take the following form:

[{FC5A4660-479C-11d1-883B-0080C7A271D8};
 {"Microsoft Word"};
 {DT3E1967-517K-33d1-294G-0060C3A747G4}]

where the phrase "{FC5A4660-479C-11d1-883B-0080C7A271D8}" is the Product Code for the Microsoft Office product, the phrase "Microsoft Word" is the feature identifier for the Word Feature, and the phrase "{DT3E1967-517K-33d1-294G-0060C3A747G4}" is the Component Code for the Word Executable Component.

In response to the Provide Component call, the installer application 201 queries the installer registry 202 for the keypath 214 associated with the token 212. The installer application 201 then verifies that the key file 230 exists in its specified location, and if so, returns the keypath 214 to the shortcut 207, which in turn prompts the operating system 35 to execute the word.exe 230 key file at the location identified by the keypath 214. As discussed above, the word.exe 230 key file is stored on the hard-disk drive 205 under the folder IIC:\Programs\Office\Word\.

The operating system 35 executes the word.exe 230 key file from the location identified by the keypath 214. The word.exe 230 key file then assumes control of the shell created by the operating system 35. While the word.exe 230 key file is executing, it is referred to as the "Word application" 208. The Word application 208 may then perform a startup procedure and continue loading. For instance, the Word application 208 may issue an "Enum Features" call to the installer application which returns all of the available features at once. Alternatively, the Word application 208 may issue a series of "Query Feature State" calls to the installer application 201 to individually identify which features of the Word application 208 are installed. In response to either call, the installer application 201 may query the installer registry 202 to identify whether a particular feature of the Word application 208 is installed, and return that information to the Word application 208. The Word application 208 may perform such calls in order to populate a menu bar or toolbar of the Word application 208. Once the startup procedure is complete, the Word application 208 is available for use by the user.

During operation, the user may select a particular feature of the Word application 208 for activation. For instance, the user may select a "spell check" option from the menu bar or toolbar of the Word application 208. In response to such a selection, the Word application 208 may query the installer application 201 for the keypath to the component or components necessary to support the feature. For instance, in the disclosed example, a Spelling Component may be necessary to support the feature associated with the "spell check" option of the Word application 208. In that case, when the user selects "spell check," the Word application may pass a "Provide Component" call to the installer application 201 along with a token 216 identifying the Spelling Component.

In response to the Provide Component call, the installer application 201 may verify the installed state of the calling feature identified in the token, and provide the keypath to the component identified in the token. In this example, the key file of the Spelling Component is the speller.exe 233 key file. Consequently, when the installer application 201 receives from the Word application 208 a Provide Component call with a token identifying the Spelling Component, the installer application 201 queries the installer registry 202 for the keypath associated with that token. The installer application 201 then returns the keypath to the Word application 208, which then instructs the operating system 35 to execute the speller.exe 233 key file at the location identified by the keypath. Once the operating system 35 has launched the speller.exe 233 key file, the Speller Component is available to the Word application 208. In this manner, the Word application 208 may query the installer application 201 each time the user attempts to activate another feature, and the installer application 201 returns the keypath for the appropriate component.

The foregoing has been a general overview of the functionality of an installer application 201 which may benefit from an exemplary embodiment of the present invention. The discussion will now explain in greater detail the inventive aspect of repairing an application program if a key file is inadvertently deleted or otherwise becomes unavailable to the application program at the keypath location.

Repairing a Missing Resource

Figure 3:
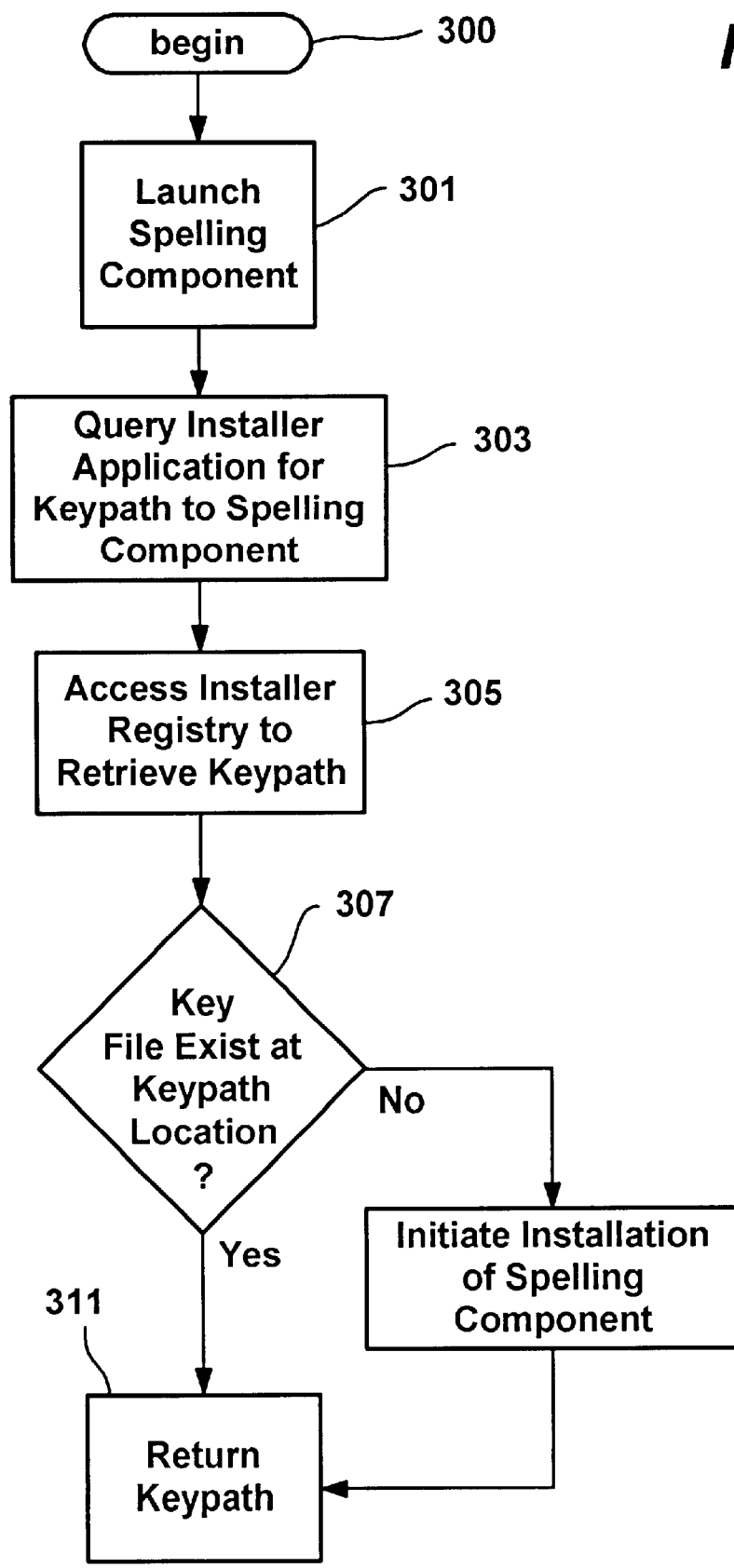
FIG. 3 is a logical flow diagram depicting a process for verifying the existence of installed resources, and for installing any inadvertently missing resources in accordance with an exemplary embodiment of the present invention.

FIG. 3 is a flow chart which, taken in conjunction with FIG. 2, illustrates, in general, a process performed by the installer application 201 of the disclosed embodiment to verify the existence of the installed resources of an application program such as the Word application 208, and to install any inadvertently missing resources. The process starts at beginning step 300 where the Word application 208 is installed to the computer 20. As discussed above, during the installation process, the features and components of the Word application 208 are installed to appropriate locations on the computer 20. For example, the word.exe 230 key file of the Word Executable Component is installed at the location identified by the keypath "C:\Programs\Office\Word\." That keypath 214 is written to an entry in the installer registry 202 and associated with the token 212 corresponding to the Word Executable Component.

In addition, the speller.exe 233 key file of the Spelling Component is installed at the location identified by the keypath "C:\Programs\Office\Word\Proofing Tools\." That keypath 218 is written to an entry in the installer registry 202 and associated with the token 216 corresponding to the Spelling Component. Processing continues at step 301, where the Word application 208 is executing in the RAM 25 of the computer 20.

At step 301, the Word application 208 is executing in memory. As discussed above, features may provide functionality to the Word application 208. One such feature may be the Proofing Tools Feature. Included in that feature is the Spelling Component, which provides the user with the ability to check the spelling of words in a document. In response to the user selecting a "spell check" option from the menu, the Word application 208 may attempt to launch the Spelling Component to service the user's selection. If so, then processing continues to step 303.

At step 303, the Word application 208 begins to launch the Spelling Component by querying the installer application 201 for the keypath 218 to the Spelling Component. The query may take the form of an API call to the installer application 201, as discussed in greater detail below with respect to FIG. 4. The Word application 208 includes, as a parameter of the call, the token 216 identifying the Spelling Component. Processing then continues at step 305.

At step 305, in response to the query from the Word application 208, the installer application 201 accesses the installer registry 202 to retrieve the keypath 218 associated with the token 216 identifying the Spelling Component. When the installer application 201 has retrieved the keypath 218 to the Spelling Component, processing continues at decision block 307.

At decision block 307, the installer application 201 verifies the existence of the Spelling Component at the location defined by the keypath 218. Verifying the existence of the Spelling Component may include querying the operating system 35 for the existence of the speller.exe 233 key file at the location identified by the keypath 218. Verifying the existence of the speller.exe 233 key file prior to returning the keypath 218 to the Word application 208 helps to ensure that the Word application 208 will not receive an error when attempting to launch the Spelling Component. If the speller.exe 233 key file is not missing, processing continues at step 311. If the speller.exe 233 key file is missing or otherwise unavailable, processing continues at step 309.

At step 309, the installer application 201 initiates the installation of the Spelling Component. In the disclosed embodiment, installing the Spelling Component may include re-installing the entire feature in which the Spelling Component is contained. The installation of the Spelling Component may be performed automatically, without user intervention or knowledge. Alternatively, the query sent to the installer application at step 303 may include a parameter indicating that the installer application 201 should not automatically install any missing components, but rather suspend processing and allow the Word application 208 to prompt the user for instructions. When the missing Spelling Component has been installed, processing continues at step 311.

At step 311, the missing Spelling Component has been installed and its existence verified, and the installer application 201 returns the keypath 218 to the Word application 208. The Word application may then proceed to launch the Spelling Component in the ordinary manner, such as by prompting the operating system 35 to execute the speller.exe 233 key file at the location identified by the keypath 218.

Detailed Discussion of Repair Process

Figure 4:
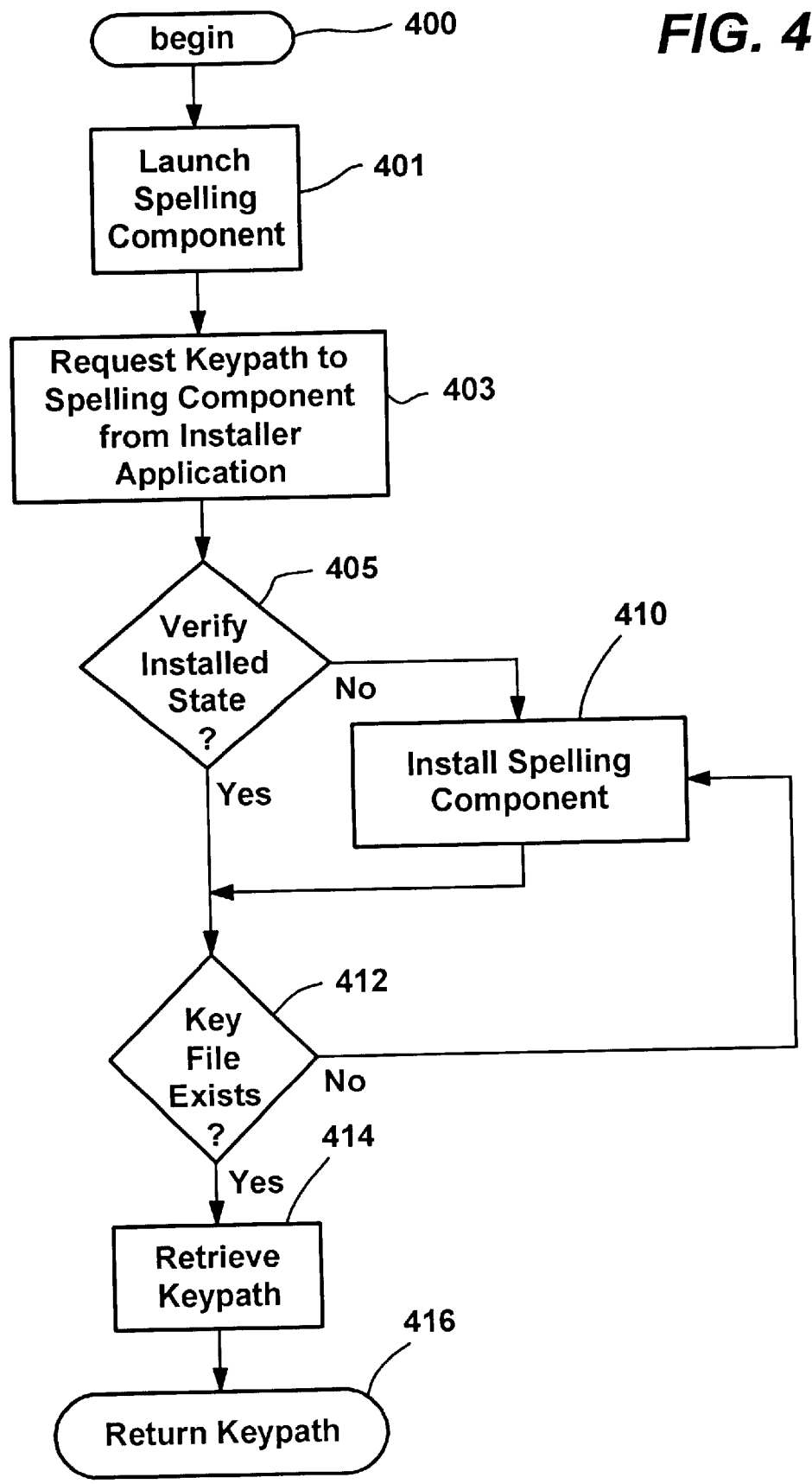
FIG. 4 is a logical flow diagram depicting, in greater detail, a process for verifying the existence of installed resources, and for installing any inadvertently missing resources in accordance with an exemplary embodiment of the present invention.

FIG. 4 is a flow chart which, taken in conjunction with FIG. 2, illustrates, in more detail, a process performed by the installer application 201 of the disclosed embodiment to verify the existence of the installed resources of an application program, such as the Word application 208, and to install any inadvertently missing resources. The process starts at beginning step 400 where the Word application 208 is installed substantially as described above with respect to FIG. 3. Processing begins at step 401.

At step 401, the Word application 208 is executing in memory and the user selects a "spell check" option from the menu, causing the Word application 208 to attempt to launch the Spelling Component. Once the user selection is performed, processing continues at step 403.

At step 403, the Word application 208 attempts to launch the Spelling Component by issuing a call to the installer application 201 to return the keypath 218 to the speller.exe 233 key file associated with the Spelling Component. The call may take the form of a "Provide Component" call issued to the installer application 201 and having the token 216 as a parameter. As discussed above, the token 216 may include the Product Code, the feature identifier, and the Component Code for the Spelling Component in a format which may be interpreted by the installer application 201.

In accordance with the disclosed embodiment, the Provide Component call may be interpreted by the installer application 201 as three separate calls. The installer application 201 may respond to the Provide Component call as if a "Use Feature" call, a "Configure Feature" call, and a "Get Component Path" call had been issued. Each of those calls is briefly described below, and the following discussion will assume that each of the three separate calls had been issued when in fact only the Provide Component call was issued. Those skilled in the art will appreciate that a single API call may be interpreted as multiple calls, and the installer application 201 may respond as if each of the multiple calls had been issued independently. Processing continues at step 405.

At step 405, the installer application 201 receives the Provide Component call from the Word application 208 and executes the first portion, the Use Feature call. The installer application 201 responds to the Use Feature call by verifying the installed state of the Spelling Component identified by the token 216. In addition, because components may not function properly individually, the installer application 201 may verify the installed state of each component of the feature identified by the token 216. In response to the call, the installer application 201 may attempt to retrieve the keypath 218 associated with the token 216 from the installer registry 202. If the keypath 218 exists in the installer registry 202, then the Spelling Component has been installed, and processing proceeds to decision block 412. It is important to note that although the Spelling Component has been installed, it is possible that a portion of the Spelling Component, such as the speller.exe 233 key file, has been inadvertently deleted, as previously discussed. If the keypath 218 does not exist in the installer registry 202, then the Spelling Component has not been installed, and processing continues to step 410.

At step 410, the installer application 201 continues to operate on the Provide Component call by responding to the second portion, the Configure Feature call. In response to the Configure Feature call, the installer application 201 may force the installed state of the Spelling Component. In other words, the installer application 201 initiates the installation of the Spelling Component. The installation of the Spelling Component may be automatically performed by the installer application 201 in a background process while the Word application 208 waits. Alternatively, the installer application 201 may conduct negotiations with the Word application 208 to determine whether to automatically install the missing component, or to prompt the user for additional input, or some other method of handling the error. In the disclosed embodiment, the installer application 201 may be unable to install a single component, in which case the installer application 201 may initiate the installation of a feature containing the Spelling Component. When the installation of the Spelling Component is complete, processing proceeds to decision block 412.

At decision block 412, the installer application 201 continues processing the Configure Feature call by verifying the existence of the speller.exe 233 key file associated with the Spelling Component. The installer application 201 may query the operating system 35 to verify that the speller.exe 233 key file exists at the location identified by the keypath 218. Those skilled in the art will appreciate that the installer application 201 may perform conventional operating system 35 queries to verify the existence of the speller.exe 233 key file at the keypath 218 location. If the speller.exe 233 key file does not exist at the location identified by the keypath 218, processing returns to step 410 where the installer application 201 initiates the installation of the Spelling Component. If at step 412 the existence of the speller.exe 233 key file is verified, processing continues at step 414.

At step 414, the existence of the speller.exe 233 key file has been verified and the installer application 201 continues to operate on the Provide Component call by responding to the third portion, the Get Component Path call. In response to the Get Component Path call, the installer application 201 may perform a simple look-up in the installer registry 202 for the keypath 218 associated with the token 216. By performing the previously-discussed steps, the installation and the existence of the speller.exe 233 key file have been verified. Accordingly, the installer application 201 may merely look up, in the installer registry 202, the token 216 associated with the speller.exe 233 key file and retrieve the keypath 218 associated with that token 216. When the keypath 218 is retrieved, processing continues at step 416.

At step 416, the installer application 201 returns the keypath 218 to the calling application. In this instance, the calling application is the Word application 208, which then instructs the operating system to launch the speller.exe 233 key file at the location identified by the keypath 218. Thus, the application program is able to continue, following a repair pursuant to the present invention, as though the repair had not been needed. Accordingly, the knowledge required of the user concerning how to run set-up programs or the like to fix the broken feature is greatly reduced.

Alternative Embodiments

From the above description, alternative embodiments will be apparent to those skilled in the art. For instance, in the example discussed concerning FIG. 4, the Word application 208 passes the token 216 identifying the Spelling Component to the installer application 201. Alternatively, a "descriptor" may be passed to the installer application 201 rather than a token. This may occur, for instance, when the shortcut 207 is utilized. Because the shortcut 207 serves only the single purpose of launching its associated executable file, the shortcut 207 may include a descriptor to identify the component rather than the token 212. The descriptor may contain the same information as the token 212, except that the descriptor is formatted so that the installer application 201 need not parse the individual identifiers contained within the token 212. Accordingly, the descriptor allows the installer application 201 to more easily locate the keypath 214 associated with the token 212 within the installer registry 202.

In this example, the shortcut 207 may issue a Provide Component From Descriptor call to the installer application 201 including the descriptor as a parameter. The Provide Component From Descriptor call of this embodiment differs from the Provide Component call only in that a descriptor is passed rather than a token. In that case, the installer application 201 will function as described above, except that the descriptor takes the place of the separate tokens supplied to Provide Component.

From a reading of the above description pertaining to the disclosed embodiments of the present invention, other modifications and variations thereto may become apparent to those skilled in the art. Therefore, the scope of the present invention is to be limited only by the following claims.

What is claimed is:

1. A computer-readable medium having computer-executable instructions for repairing an application program that has become damaged, which when executed perform steps comprising:

(a) verifying that a resource operative to provide functionality to the application program is available at an expected location to the application program;

(b) in response to a positive verification of the availability of the resource to the application program, passing an existence verification to the application program; and (c) in response to a failure to verify the availability of the resource to the application program at the expected location, automatically initiating an installation procedure without manual termination of the application program to make the resource available to the application program at the expected location.

2. The computer-readable medium of claim 1, wherein:
the expected location of the resource is described by a resource path; and
the existence verification comprises the resource path.

3. The computer-readable medium of claim 1, wherein the step of verifying the availability of the resource occurs in response to an indication by the application program that the resource is needed by the application program.

4. The computer-readable medium of claim 3, wherein the indication comprises a request for the resource path to the resource.

5. The computer-readable medium of claim 4, wherein the request for the resource path includes a parameter identifying the resource.

6. The computer-readable medium of claim 5, wherein the resource path is maintained in a registration database, and the resource path is associated with the parameter identifying the resource.

7. The computer-readable medium of claim 6, wherein the step of verifying the availability of the resource includes:
receiving the request for the resource path to the resource, the request including the parameter identifying the resource;
accessing the registration database to retrieve the resource path associated with the parameter; and
attempting to access the resource at the expected location described by the resource path.

8. The computer-readable medium of claim 1, wherein the step of verifying the availability of the resource occurs in a background process while the application program awaits the result of the verification.

9. A computer-readable medium having computer-executable instructions for verifying that a resource needed by an application program is available, which when executed perform steps comprising:

(a) receiving a resource identifier comprising at least one argument from the application program, the resource identifier being associated with the resource needed by the application program, the resource being operative to support functionality of a portion of the application program;

(b) accessing a database based on the resource identifier to retrieve an expected location of the resource;

(c) verifying the existence of the resource at the expected location; and (d) in response to the verification of the existence of the resource at the expected location, passing the expected location to the application program.

10. The computer-readable medium of claim 9, wherein the resource identifier comprises a component code which uniquely identifies the resource needed by the application program.

11. The computer-readable medium of claim 10, wherein the resource identifier further comprises a feature identifier which identifies the portion of the application program.

12. The computer-readable medium of claim 9, wherein the step of receiving the resource identifier includes receiving a request for the expected location of the resource, the request having the resource identifier as a parameter.

13. The computer-readable medium of claim 9, wherein the step of accessing the database to identify the expected location of the resource includes searching through entries within the database for an entry having as a first field the resource identifier, the first field being associated with an expected resource path, the resource path being operative to identify the expected location.

14. In a computer system having an application program, the application program having a feature, the feature comprising a component, the component having a key file which supports the feature of the application program, a method for repairing the application program if the key file becomes unavailable to the application program, comprising the steps of:

(a) receiving from the application program a request for a path to the key file;

(b) identifying an expected location for the key file on the computer system, the expected location being described by a keypath;

(c) attempting to verify the existence of the key file at the expected location on the computer system; and (d) in response to a failure to verify the existence of the key file at the expected location, automatically initiating an installation of the key file to the expected location on the computer system without manual termination of the application program.

15. The method of claim 14, further comprising the step of:

(e) in response to a positive verification of the existence of the key file at the expected location, issuing to the application program the keypath to the key file.

16. A method of communicating between an installer application and an application program in a multiprocessing computer system, comprising the steps of:

(a) receiving from the application program at the installer application a provide component call including a component identifier, the component identifier being related to a key file which supports a feature of the application program;

(b) in response to the provide component call, determining if the key file related to the component identifier exists at an expected location;

(c) in response to a failure to determine that the key file exists at the expected location, automatically initiating an installation of the key file to the expected location without manual termination of the application program; and (d) when the key file is installed at the expected location, returning from the installer application to the application program a path to the expected location.

17. The method of claim 16, further including, prior to the step of determining if the key file exists, the step of:
determining if the key file has been installed by querying a registration database for the existence of an entry containing a keypath identifying the expected location of the key file.

18. The method of claim 17, wherein the step of determining if the key file has been installed includes issuing to the installer application a use feature call having a plurality of call parameters comprising the product identifier and a feature identifier, the use feature call being operative to cause the application program to query the registration database for the keypath, and to generate an indication that the entry for the keypath does not exist within the registration database when the keypath does not exist within the registration database.

19. The method of claim 17, further including the step of:
If the entry for the keypath does not exist within the registration database, initiating the installation of the key file to the multiprocessing computer system.

20. The method of claim 16, wherein the step of initiating the installation of the key file includes issuing to the installer application a configure feature call having as a parameter a feature identifier identifying the feature of the application program, the configure feature call being operative to initiate the installation of the key file from a source location to the expected location.

21. The method of claim 16, wherein the step of returning the path includes issuing to the installer application a get component path call having as a parameter the component identifier, the get component path call being operative to cause the installer application to query a registration database for the expected location of the key file and to return to the application program the expected location of the key file.

22. A computer-readable medium having a computer-executable software module for detecting that a key file is missing and for installing the missing key file, comprising:

(a) component-request functionality for receiving, from an application program, a request for a location of the key file, the key file being associated with a component and operative to provide functionality to a feature of an application program, the component being associated with the feature;

(b) key-file existence checking functionality for querying a registration database to retrieve a resource path, the resource path identifying the location of the key file, and further for accessing the location identified by the resource path to ascertain the existence of the key file; and (c) installation functionality for initiating an installation of the key file to the location identified by the resource path, whereby the installation functionality automatically initiates the installation of the key file to the location identified by the resource path in response to a determination by the key-file existence checking functionality that the key file does not exist at the location identified by the resource path and without manual termination of the application program.

* * * * *